INVENTOR.
PHILIP C. SHERBURNE

United States Patent Office 3,409,036
Patented Nov. 5, 1968

3,409,036
HYDRAULIC POSITIONER WITH SHOCK
SUPPRESSION FEATURES
Philip C. Sherburne, East Providence, R.I., assignor to
Grinnell Corporation, Providence, R.I., a corporation
of Delaware
Filed Apr. 12, 1966, Ser. No. 542,110
17 Claims. (Cl. 137—343)

This invention relates to improvements in devices and methods for moving piping or similar fluid handling equipment in accordance with changes is the temperature thereof. More particularly it has to do with the provision of equipment and methods for forcing the piping to a particular position for each temperature, for releasing the piping and allowing it to move freely away from that position at a slow rate, for forcing the piping back to that position after a certain amount of movement therefrom and suppressing any sudden piping movements which may occur during the application or release of the force.

In many industrial processes, high temperature fluids are conducted through pipe lines from a source to a remote destination. For example in power plants the electricity generators are often driven by turbines receiving steam from a boiler through relatively long pipe lines. Of necessity such systems are installed and connected at room temperatures, and as a practical matter it has never been possible to arrange the turbine, boiler and pipe lines so that the thermal growths of these items between room temperatures and operating temperature exactly accommodate each other. Instead these items resist each other's thermal movement with the result that expansion stresses have always appeared in these pipe lines and at their end connections to the boiler and turbine and have always had to be minimized by purposely arranging the pipe lines into large expansion bends. More recently, these stresses have been further minimized in many installations by also applying external forces to certain portions on the pipe line and moving these portions in certain ways. More specifically, these movements by the external forces have been controlled in accordance with system temperature and have been of such magnitude and direction that the stresses which are calculated to occur at the critical end connections (where stresses are the least tolerable) have been reduced. The stresses in the remainder of the pipe line have usually been increased by such movements, but there the increased stresses are not harmful.

In order that a failure of one of these prior art devices will not result in the pipe line being rigidly held in a position which, though calculated to be proper at one temperature, is wrong for a subsequent temperature and might produce an intolerable stress condition at a critical point, many have been of the pump-driven, hydraulic piston-cylinder type and have by-passed the hydraulic fluid around the piston when the proper pipe position has been reached. Such by-passing removes the external force and prevents the device from interferring with any moving which the pipe line may wish to do if and after the pump, pump motor or switches have failed. As a result of this fail-safe feature it has also been true, however, that where the prior art device has operated normally and the pump has merely turned off the pipe line is also free to move where it may wish to go.

During changes in temperature, exemplified by a warm-up in a power plant, the pipe is usually endeavoring to move to a different position than the one it is currently occupying. For example, after a pump failure or normal operation shut-off the resiliency of the pipe line will often endeavor to move the pipe line back to where it was before the force exerting device moved it, and even if there is no such tendency at a particular temperature a subsequent change in the temperature of the pipe line would cause it to want to move on from its position at the time of the failure or shut-off. In the case of a normal operation shut-off only a slight return movement would take place before the controls would turn the pump on again, the by-pass would close and the pipe line would be returned to the correct position for that temperature. This hunting is not objectionable, and after a period of time at the elevated operating temperatures the pipe line usually loses its tendency to move back after shut-off.

The difficulty has been that in these prior art devices no satisfactory provision has been made for the suppression of sudden movements of the pipe line caused by shocks. The tripping of safety valves and earthquakes are examples of shocks which would produce convulsive, reactive movements needing suppression.

The reason for the difficulty is that same prior art by-passing which has permitted the pipe line to move freely back toward a former position when the pump has failed or turned off has also permitted rapid, large amplitude pipe line movements when the above-mentioned shocks occur. Mere restriction of these by-passes have been considered, and this would suppress shock movements, but in all the known prior art systems these same by-passes have also been located in the path of the hydraulic fluid flowing from the pump to the cylinder. As a result any by-pass restriction which has been a satisfactory shock suppressor has also constituted an obstruction to the pump in normal operation. The size of the pump required to overcome this obstruction, and at the same time satisfactorily actuated the piston-cylinder unit, is prohibitively large.

To overcome the last mentioned difficulty it has been proposed that check valves be located in the by-pass in the place of the restrictions and that these check valves be closed only by the pressures resulting from shock movements. The difficulty here is that even the tendency of the pipe is to move slowly back to a former position under normal operating conditions produces pressure which cannot easily be distinguished from that caused by shocks. The slow movement must be permitted. The shock movement must be prevented.

The present invention overcomes all these difficulties by providing equipment and methods for maintaining a restricted by-pass open at all times, and for supply pump pressure to the cylinder along flow paths which do not pass through this by-pass. With this arrangement slow rates of piston movement are substantially unrestrained, sudden movements of the pipe line are suppressed, and the fluid delivered by the pump to the cylinder is not restricted in any way. Because the by-pass is open at all times the pump pressures differential across the piston is less than it would otherwise be. However, the by-pass restriction is so small that the efficiency with respect to pump use is not significant.

Each of the prior art hydraulic force exerting devices has usually employed a reversible gear pump driven by a reversible electric motor and feeding opposite ends of the cylinder in which the piston is located. These connections have usually been provided through a selector valve actuated to its various positions by pump pressures. One such valve position connects the pump discharge to one side of the piston. An opposite valve position connects the pump discharge to the other side of the piston. When the pump is not running springs actuate the valve into a third position connecting the opposite sides of piston to each other and to the reservoir. It is this last-mentioned selector valve position which has provided the by-pass around the piston when the pump is not running. Because of the temperature expansion and contraction of the hydraulic fluid, and because of inevitable leakage, all these prior art devices have had a reservoir suitably connected to the pump intake.

In a preferred form of the present invention the above-described prior art devices are improved first by employing a modified slide valve in which the connections between the pump, the cylinder and the reservoir are the same when the pump is running as in the prior art, but in which these connections are all blocked at the slide valve when the pump is not running. Second, in the preferred form of the present invention the prior are devices are improved by providing a restricted conduit in by-passing relation to the opposite sides of the piston. This conduit, though restricted, is always open so that even when the slide valve is in its neutral position the piston is free to move slowly. Third, in the preferred form of the present invention the prior art devices are improved by connecting the opposite sides of the piston directly to the reservoir through relief valves which are set to open only upon the occurrance of unusually large pressures. These relief valves prevent rupture of the hydraulic system by those pressures which extraordinary shocks might develop in the piston-cylinder unit. Finally, in the preferred form of the present invention the prior art devices are improved by extending the piston rod from both sides of the piston and through both ends of the cylinder. Volume changes on opposite sides of the piston are then the same for any given piston movement.

Accordingly, it is one object of the present invention to provide devices and methods for moving pipe or similar fluid handling equipment in accordance with changes in the temperature thereof by supplying hydraulic pressure along a path to a piston-cylinder unit connected to the equipment, by blocking said path when the equipment is in the desired position and the supply pressure is relieved and by permitting hydraulic fluid to by-pass the piston through a restriction while the path is blocked.

Another object is to provide a device of the kind described in which the supply pressure is provided by a reversible pump, in which this pump actuates a selector valve to establish the path from the pump to one side of the piston and simultaneously establishes another path from the other side of the piston to a reservoir, in which the selector valve blocks both these paths in response to the pump turning off and in which the restriction is located in a third path permanently by-passing the two sides of the piston.

Another object is to provide a device of the kind described in which a check valve is located in the path from the one side of the piston.

Another object is to provide a device of the kind described in which the opposite sides of the piston are connected to the reservoir along still other paths which are uncontrolled by the selector valve but which contain relief valves.

Another object is to provide a device of the kind described in which the piston rod extends from both sides of the piston and through both ends of the cylinder, so that for each piston movement the volume changes on opposite sides of the piston are the same.

Another object is to provide devices and methods for moving pipe or similar fluid handling equipment which are inexpensive, efficient in use and easy to apply.

Other objects will appear hereinafter.

The best modes in which it has been contemplated applying the principles of the present invention are shown in the accompanying drawings, but these are to be deemed primarily illustrative for it is intended that the patent shall cover by suitable expression in the appended claims whatever of patentable novelty exists in the invention disclosed.

In the drawings:

FIGURE 1 is a somewhat diagrammatic view of a hydraulic force exerting system which may be employed to practice the present method invention and which is in accordance with the present apparatus invention, this view showing many of the hydraulic components in section, showing the piston-cylinder unit connected to a pipe line and showing the hydraulic valves in the positions they assume when the pump is driving the piston in one direction.

Figure 1:
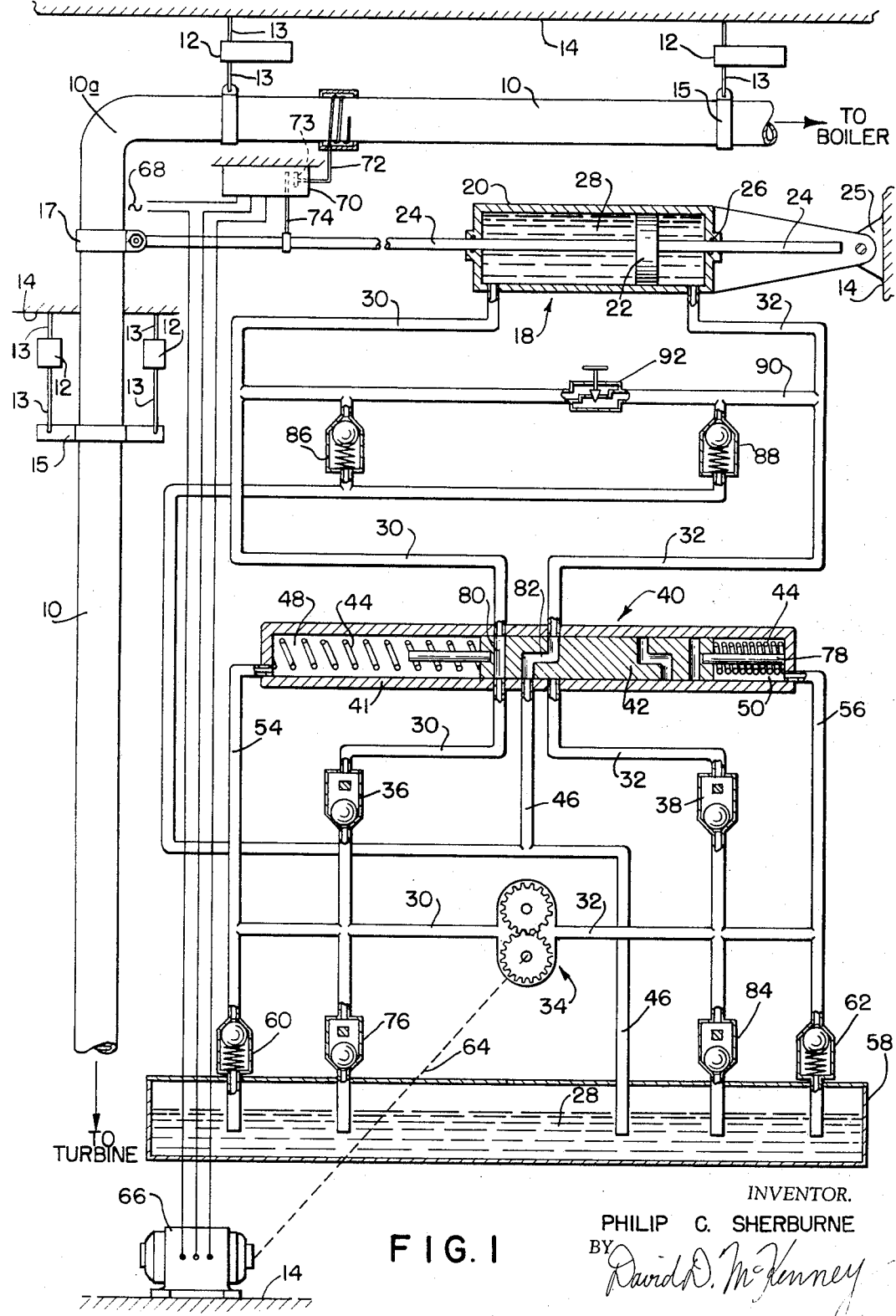

Referring now more particularly to the drawings, 10 indicates a piece of equipment which is subject to movement with changes in temperature. For example, in FIG. 1 this piece of equipment is a section of main steam pipe line in an electric power plant. Such a line would connect a boiler (not shown) to a turbine (not shown). In a typical case the pipe for such a line would have a 20 inch O.D., a 14 inch I.D. and be about one hundred and fifty feet long. It would usually have several bends like 10a, and several vertical and horizontal sections. The great weight of this pipe is supported by spring hangers 12 shown diagrammatically in FIG. 1. These hangers may be of conventional design, connected at intervals along the pipe length and permitting vertical movements of all pipe sections without substantial change in vertical supporting force. These vertical movements result primarily from expansion of the pipe sections. Corresponding horizontal movements resulting from expansion of the horizontal pipe sections may cause hanger rods 13 to swing somewhat but such swinging does not upset the proper operation of the hangers 12. U.S. Patent No. 2,709,057, issued May 24, 1955 shows the details of satisfactory weight-supporting devices. Here, as in that patent, the hangers are shown suspended from fixed overhead structure 14. In a power plant this would be the steel building griders. Pipe straps 15 provide the connection between the hanger rods 13 and the pipe line 10.

A special pipe strap 17 also embraces line 10 and constitutes thereto of a special force exerting device 18. This device 18 comprises a horizontally disposed hydraulic cylinder member 20, a piston member 22 and a piston rod member 24. The cylinder member is pivotally connected to the fixed structure 14 by a bracket 25, and the piston rod member 24 is pivotally connected to the special strap 17. These pivotal connections are of the kind in which the slack taken up upon reversal of the piston movement is negligible.

Which section of the pipe line 10 the force exerting device 18 ought to be connected to and the orientation of this device with respect to this section are determined in advance by calculations as to the pipe line position producing the minimum stress conditions at the critical points. For the purpose of this description it is assumed that these calculations call for movement of the sections shown to the right with increases in pipe temperature in order to minimize stresses in the end connections.

In FIG. 1 the piston rod member 24 extends from both sides of the piston member 22 and slightly through the opposite ends of the cylinder member 20. The advantage of this arrangement is that for any given piston member movement volume changes on opposite sides of the piston member are always the same. This arrangement is by far the most preferred. However, the double ended piston rod member is not vital to other aspects of the invention, as will be understood. Seals 26 of any well known design prevent hydraulic fluid 28 from escaping from the cylinder member around the piston rod member.

Figure 2:
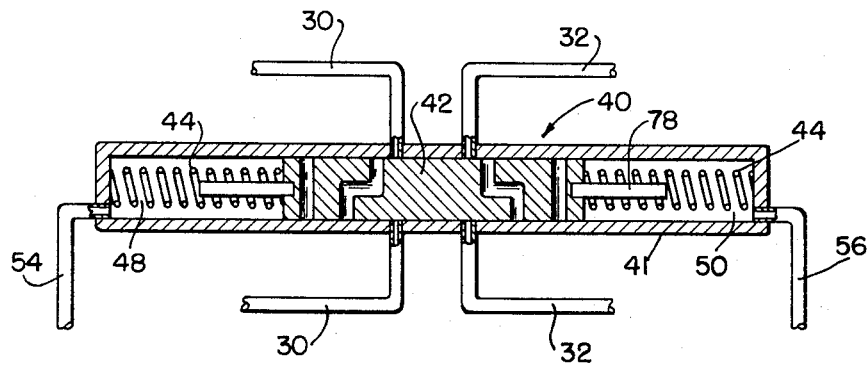
FIGURE 2 is a view of the slide valve of FIG. 1, showing one of the valves in the different position it assumes when the pump is not operating.

From the opposite ends of the cylinder member fluid conduits 30 and 32 lead back to opposite sides of a reversible gear pump 34. These conduits contain check valves 36 and 38, respectively, and a slide valve 40. The check valves permit flow only in a direction away from the pump. The slide valve has a casing 41 and an armature 42 which is movable therein and which is normally held in a center position by springs 44. FIG. 2 shows that in this center position the conduits 30 and 32 and a third conduit 46 also leading to casing 41 are all blocked by this armature. The springs 44 are located in closed actuator chambers 48 and 50 defined, in this embodiment, by portions of the same casing 41 and by the ends of the movable member. A conduit 54 leads from chamber 48 to a point on conduit 30 between the pump 34 and check valve 36. Similarly, a conduit 56 leads from chamber 50 to a point on conduit 32 between the pump 34 and check valve 38.

The conduit 46 leads to a reservoir 58 which holds an extra supply of hydraulic fluid 28. This supply makes up for decreases in the fluid volume caused by leaks in the system and by any significant lowering of the fluid temperature. The reservoir 58 also receives from the system during normal operation thereof the excess hydraulic fluid which results from any significant temperature expansion thereof. In addition the reservoir receives any fluid which is forced through the several relief valves (not yet described) by any unusually large pressures. Such pressure may be caused by shocks or by a malfunction of the pump mechanism which regulates the pump discharge pressure. Thus, conduits 54 and 56 are connected to the reservoir through pressure relief valves 60 and 62, respectively, so that if the pump pressure should for any reason approach a valve which could rupture any part of the system one of these relief valves will open and thereby limit the amount of force which can be exerted on the pipe section 10.

The gear pump 34 is driven through a shaft 64 by a reversible electric motor 66. This motor is mounted on some part of the fixed structure 14 and receives its electric energy from a supply 68. When the motor turns on and in what direction is determined by a switch 70 actuated by the temperature of pipe 10. The details of this switch are not part of this invention. It will suffice to understand that a fluid-filled coil 72 embracing pipe 10 acts in the manner of Bourdon tube and moves a switch armature 73 with changes in temperature. This armature eventually closes electric contacts (not shown) to turn on motor 66 if the pipe 10 is not already in its proper position for that temperature. A feed back armature 74, connected to piston rod member 24, also enters switch 70 and opens the contacts to turn off the motor when the moving pipe has reached the proper position for the then existing temperature.

Assume that turbine is being started up and the temperature of the pipe line 10 has risen to a few degrees above room temperature. Also assume that for this new temperature the FIG. 1 pipe position is too far to the left. In accordance with the predetermined relationship of armatures 73 and 74, this rise in temperature will cause switch 70 to start the motor 66 in a direction which makes the pump 34 discharge into conduit 30.

A check valve 76 is connected between the reservoir 58 and the portion of conduit 30 between the pump and selector valve 40. This check valve is held closed by pump discharge pressure in conduit 30, and the parallel relief valve 60 is adjusted so as to be opened only by pressures exceeding the normal pump discharge pressure. This discharge pressure is communicated through conduit 54 to valve actuator chamber 48 where it moves armature 42 to the position shown in FIG. 1. The springs 44 are chosen so that the normal pump discharge pressures will move the armature 42 until stop 78 engages the end wall of chamber 50. In this position of the armature a port 80 therethrough opens conduit 30. The check valve 36 is so arranged as to permit flow of the hydraulic fluid along conduit 30 only in the direction from the pump toward the force exerting device 18.

The result of the above is that hydraulic fluid from the pump flows into cylinder member 20 on the left side of the piston 22. This moves piston member 22 to the right and pulls the pipe toward the position it is supposed to occupy for the new higher temperature. Simultaneous movement of the switch armature 74 by the piston member causes the switch 70 to turn off the motor 66 when the pipe 10 has reached the predetermined desired position.

The FIG. 1 position of the valve armature 42 also connects conduit 32 to conduit 46 via armature port 82. This provides the hydraulic fluid which is in the cylinder member on the right side of piston 22 with an unrestricted path back to the reservoir. With the pump operating in the direction described conduit 32 becomes the pump intake, receiving hydraulic fluid from the reservoir through a check valve 84 which corresponds to check valve 76.

As the temperature of pipe 10 continues to rise, the further operation of the fluid filled coil 72 on switch 70 will again turn on motor 66 and again cause device 18 to move the pipe 10 to the right, and after the predetermined amount of such additional movement has been achieved the feed back armature 74 will again turn the motor off. This intermittent operation will continue until the pipe has reached its full operating temperature, for example, 1000° F.

Each time the motor 66 turns off the springs 44 immediately move the slide valve armature 42 to the center position shown in FIG. 2. The reason for this is that when the pump turns off the discharge pressure in conduits 30 and 54 and in chamber 48 dissipates back through pump gears, permitting the balanced springs 44 to determine the armature position. The pipe 10 may resist being pulled to the right by device 18, and after the pump has turned off such resistance may itself maintain substantial pressure in cylinder member 20 on the left piston member 22, and in conduit 30. However, this pressure cannot back past check valve 36 to chamber 48, and though it is present in port 80 it cannot effect the position of the movable armature 42. Accordingly, when the pump turns off this armature quickly assumes the position of FIG. 2 thus preparing the system for the suppression of any shocks which may occur.

During the intermittent operation above described the parameters are usually selected so that device 18 moves the pipe 10, and hence switch armature 74, at a much more rapid rate than the tube 72 moves the switch armature 73. Hence, while the pipe temperature is changing the pump is off a good deal more than it is on, and the slide valve member 42 is in its mid-position most of the time. Furthermore, after the pipe line has reached operating temperature the slide valve armature 42 will usually remain in its FIG. 2 position an even greater proportion of the time, because the tendency for the pipe 10 to move back toward its cold position decreases as the pipe line is held at its operating temperature.

When the slide valve armature 42 is in its mid-position the portions of conduits 30 and conduit 32 which are between the slide valve and the device 18 are blocked from conduit 46 leading to the reservoir 58. If a heavy shock is then experienced by the pipe 10, for example the sudden operation of a stop valve or safety valve or by an earthquake, the force exerting device 18 suppresses the sudden large amplitude pipe movements which would otherwise accompany such shock.

Assume that the direction of this pipe section shock movement is to the right in the drawings. Since conduit 32 is blocked at the slide valve no fluid can be forced from the cylinder member along this path. Similarly, if the shock movement is to the left, no fluid can be forced from the cylinder member via closed conduit 30. There is opportunity for fluid to leave the cylinder member if relief valves 86 or 88 open, but these are set to be opened only by very high pressures, namely those just below the pressures which might rupture the hydraulic system at some point. The usual shock would not produce such pressures. In any event the resistance to shock movements afforded by the pressures up to the relief valve settings effectively suppress even the shocks which produce higher pressures.

A conduit 90 with a restriction 92 therein permanently by-passes the opposite sides of the piston member 22. A sudden shock will force some hydraulic fluid through this conduit 90 and thereby permit some piston member movement, but the restriction 92 is so small that this movement is negligible.

The purpose of this by-pass conduit 90 and restriction 92 therein is to freely permit those very slow pipe movements which take place as a result of temperature expansion of the pipe, and of the steam generating and consuming equipment. Thus, for example, if the motor 66 should burn out at some time during a warm-up of the power plant the force exerting device would thereafter be unable to move the pipe 10 to its proper position for each of the subsequent higher temperatures. In such event it is important that the pipe 10 be permitted to move freely to the positions determined by its own temperature expansion and that of the other equipment. Such positions are not as favorable, from a stress point of view, as the positions achieved by device 18, but they are much better than the one position at which the pipe would be held after the motor failed. The inoperative device 18 must not become a rigid anchor. Because such temperature expansion movements are usually in the order of an inch per hour, or less, even a small restriction 92 will permit them to take place without hinderance. On the other hand the movements achieved by a normally operating device 18 are usually in the order of an inch per minute or more.

The restriction 92, taken with the friction in the remainder of the by-pass path around piston 22, provides a total resistance to flow which is substantially greater than the total resistance afforded by any other path from the cylinder member.

In the FIGS. 1 and 2 embodiment the piston rod member 24 member extends from both ends of cylinder member 20 so that for each piston member movement the changes in cylinder member volume on opposite sides of the piston member 22 are the same. The lack of connection with the reservoir 58 is therefore not a problem during the slow movements. It is possible that extra fluid may be needed in the piston-cylinder unit after there has been a motor failure and the armature 42 is in its center position. This need may arise as a result of leakage or temperature contraction of the hydraulic fluid in the piston-cylinder unit. However such shortages of fluid are likely to be so small that they will not adversely effect the operation before the motor is repaired or replaced and the slide valve 40 next operates. Similarly if after a motor failure heat expansion of the hydraulic fluid causes the pressures in cylinder member 20 and conduits 30, 32 and 90 to become excessive, relief valve 86 or 88, or both, will open and bleed the excess fluid to the reservoir.

If a shock occurs while the slide valve armature 42 is at one of the ends of the casing 41 the system will still suppress the shock movements of the pipe 10 which take place in one direction. Thus, in FIG. 1 a shock movement of pipe 10 to the left will be suppressed because of check valve 36. Similarly, if the slide valve armature 42 is held toward the left-hand end of casing 41 during a shock movement of pipe 10 to the right will be suppressed because of check valve 38.

Figure 3:
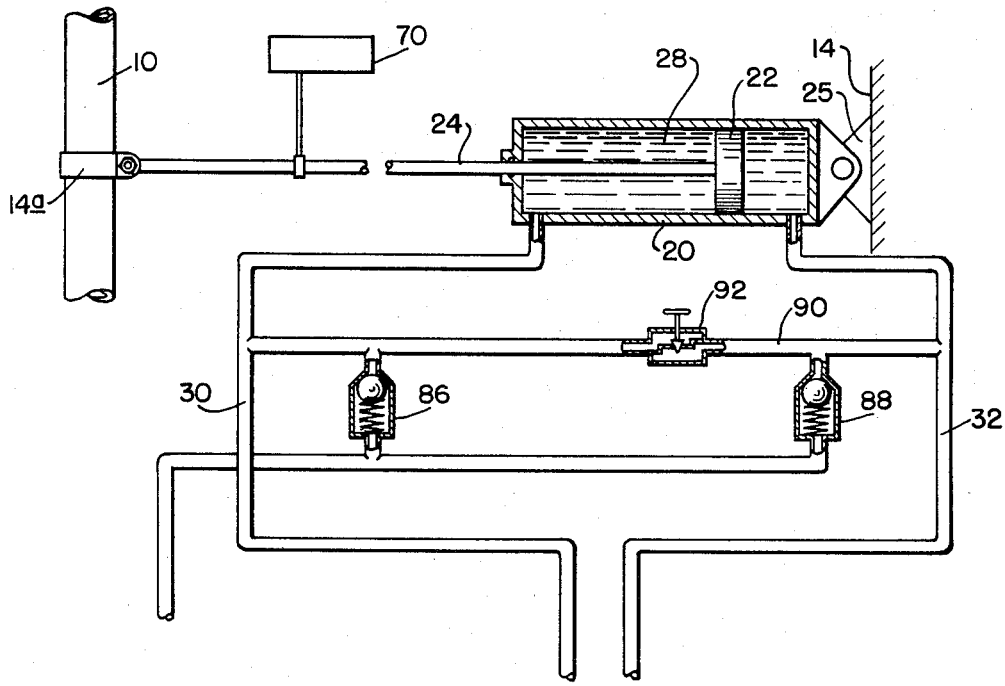
FIGURE 3 is a view of another piston-cylinder unit which may also be used.

FIGURE 3 shows a slightly different embodiment of the invention in which the piston rod member 24 extends only from one end of the cylinder member 20. When the slide valve armature 42 is centered shock movements of pipe 10 to the right or left would be suppressed in the same manner as in the previously described embodiment. However, because of the pressure of the piston rod member only on the left side of the piston shock movement to the right in FIG. 3 expels more fluid from the cylinder member on the right side of this piston than is required on the left side to keep the cylinder member full. Accordingly, the pressure in conduit 32 and in the portion of conduit 90 to the right of restriction 92, will rise more quickly than it would in the embodiment of FIG. 1. If this pressure approaches the valve which would rupture the system relief valve 88 will open. Conversely, a given shock movement of the piston member to the left in FIG. 3 expels less fluid from the left side of the piston member than is required on the right side of this member. Accordingly, a partial vacuum is produced in conduit 32 and the portion of the conduit 90 to the right of restriction 92. Nothing corresponding to relief valve 88 is used for this situation the conduits are strong enough to resist collapse by any amount of partial vacuum.

This more rapid build up of pressure in the FIG. 3 embodiment and this creation of a partial vacuum contribute to the suppression of the shock by additionally resisting the piston member movements which produce them.

When the pump is turned off in FIG. 3 and the armature 42 is in its center position slow movements of the pipe section 10 will result in substantially unhindered movement of hydraulic fluid through the restriction in 92. Here again, however, the amount of hydraulic fluid expelled from the cylinder member when the piston 22 moves slowly to the right is greater than the amount of hydraulic fluid simultaneously drawn into the cylinder member on the other side of the piston. Consequently, after enough of this slow pipe movement the pressure in conduit 32 will have increased sufficiently to open relief valve 88. Conversely, when the pipe section 10 moves slowly to the left a partial vacuum is created in conduit 32. Both this pressure increase and this vacuum present resistance to the free movement of the pipe section 10 when the pump is turned off. It is preferred not to interfere even in this way with free pipe movement, but in certain installations there is little likelihood of the pipe's wanting to move a substantial distance before a malfulcion can be repaired and there is little likelihood of the pipe's wanting to move a substantial distance after the pump turns off normally. In such installations the advantages of the single ended piston rod could be the primary consideration. The double ended piston rod, which avoids these pressure and vacuum conditions, has the disadvantages of requiring extra seals, of needing special clearance for the extending rod and of needing extra overall length for the unit.

Figure 4:
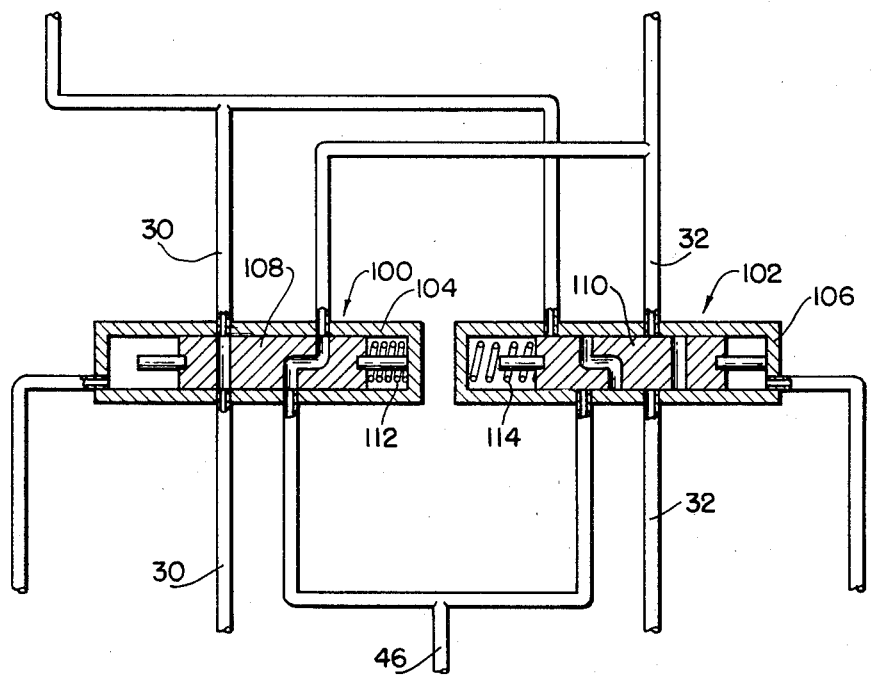
FIGURE 4 is a view like FIGURE 2, but showing another embodiment employing two valves.

Although control of the flow of hydraulic fluid by a single valve 40 is preferred, it will be understood that several valves can be employed as is shown, for example, in FIG. 4. In this embodiment there are two valves 100 and 102 with casings 104 and 106, armatures 108 and 110 and springs 112 and 114, respectively. When the pump is discharging into conduit 30 the valve armature 108 and 110 are in the positions shown with the same result illustrated in FIG. 1. When the pump is discharging into conduit 32 the positions of the valve armatures are reversed with the results which will be understood at this time.

As an example of a practicing of the present method invention with a system constituting one embodiment of the apparatus invention, the FIG. 1 components designated by numerals 34 through 82 were components manufactured by Oil Dyne, Inc. of Minneapolis, Minnesota and designated by that company as its Number 5 Pump, Type EF, with Internal Relief Valves and Duplex Pressure Switch. See, for example, page 12 of Oil Dyne, Inc. Catalog No. 63. This assemblage of components includes the portions of conduits 30 and 32 which are between the pump 34 and valve 40.

The remaining conduits and the portions of conduits 30 and 32 between the valve 40 and the cylinder member 20 were ¼″ I.D. steel tubing capable of withstanding shock loads up to 3000 p.s.i.

The cylinder member 20 had a bore of 4 inches and this piston 22 therein a stroke of 10 inches. The piston rod had a diameter of two inches. The cylinder member 20 was double-ended as in FIG. 1 with a shock rating of 3000 p.s.i. and a non-shock rating of 5000 p.s.i.

The relief valves 86 and 88 were set to open at about 3000 p.s.i.

The restriction 92 had an opening of about 1/100 of a square inch in one setting.

I claim:
1. Apparatus for controlling, with respect to fixed structure, the positions of at least a portion of fluid handling equipment subject to a change in position due to a change in a thermal condition of said equipment, said apparatus comprising:
 (I) a hydraulic cylinder member which has:
  (A) end walls,
  (B) a chamber defined in part by said end walls,
 (II) a piston which:
  (A) is located in said cylinder member chamber,
  (B) separates said chamber into two portions,
  (C) is movable with respect to said cylinder member to and from the end walls thereof,
 (III) a piston rod member which:
  (A) is connected to said piston,
  (B) extends through:
   (1) at least one of said cylinder member chamber portions,
   (2) at least one of said cylinder member end walls,
 (IV) means for connecting one of said members to said fixed structure,
 (V) means for connecting the other of said members to said equipment portion,
 (VI) a source of hydraulic fluid having:
  (A) means for pressurizing said fluid,
  (B) at least one discharge opening,
  (C) at least one intake opening,
 (VII) a first conduit connecting said discharge opening to one of said chamber portions,
 (VIII) a second conduit connecting said other chamber portion to a said intake opening,
 (IX) one valve member part which:
  (A) is located in said first conduit,
  (B) has a first position maintaining said first conduit closed,
  (C) has a second position maintaining said first conduit open,
 (X) another valve member part which:
  (A) is located in said second conduit,
  (B) has a first position maintaining said second conduit closed,
  (C) has a second position maintaining said second conduit open,
 (XI) means responsive to a said change in a thermal condition of said equipment for moving said one valve member part from its first position to its second position,
 (XII) means responsive to a said change in a thermal condition of said equipment for moving said other valve member part from its first position to its second position,
 (XIII) a third conduit which:
  (A) is connected between said portions of said cylinder member chamber,
  (B) by-passes said valve member parts,
  (C) has at least one portion which is more restricted than any part of the first and second conduits when said valve member parts are in their second positions, whereby fluid under pressure from said source passes substantially unrestricted to one of said cylinder member chamber portions when said valve member parts are in their second positions to thereby move the equipment portion upon a said change in a thermal condition of said equipment, whereby rapid movements of said piston with respect to said cylinder member caused by shock movements of said equipment portion are suppressed when said valve member parts are in their first positions, and whereby slow movements of said piston with respect to said cylinder member caused by temperature expansion movements of said equipment portion are substantially unhindered when said valve member parts are in their second positions.

2. Apparatus according to claim 1 wherein said valve member parts are connected together and wherein said means for moving said valve member parts comprises a fluid pressure actuator.

3. Apparatus according to claim 2 wherein said connected valve member parts form a single valve armature, wherein said armature is movable in a valve casing having ports therethrough and wherein said first and second conduits include said valve casing ports.

4. Apparatus according to claim 3 wherein said actuator has a chamber defined in part by a portion of said valve casing and a portion of said movable valve armature.

5. Apparatus according to claim 4 wherein a spring is located between said valve casing and said movable valve armature and urges said valve member parts into their first positions.

6. Apparatus according to claim 5 wherein said spring is located within said actuator chamber.

7. Apparatus according to claim 1 wherein said cylinder member chamber portions are connected to at least one of said fluid source intake openings through fourth and fifth conduits independent of said restricted third conduit portions, and wherein each of said fourth and fifth conduits has a pressure relief valve therein.

8. Apparatus according to claim 1 wherein said means for pressurizing said fluid comprises a reversible motor-driven pump having opposed discharge-intake openings.

9. Apparatus according to claim 1 wherein a check valve is located in said first conduit between said source and said one valve member part and wherein said check valve permits flow along said first conduit only away from said source.

10. Apparatus for controlling, with respect to fixed structure, the position of at least a portion of fluid handling equipment subject to a change in position due to a change in a thermal condition of said equipment, said apparatus comprising:
 (I) a hydraulic cylinder member which has:
  (A) end walls,
  (B) a chamber defined in part by said end walls,
 (II) a piston which:
  (A) is located in said cylinder member chamber,
  (B) separates said chamber into two portions,
  (C) is movable with respect to said cylinder member to and from the end walls thereof,
 (III) a piston rod member which:
  (A) is connected to said piston,
  (B) extends through:
   (1) at least one of said cylinder member chamber portions,
   (2) at least one of said cylinder member end walls,
 (IV) means for connecting one of said members to said fixed structure,
 (V) means for connecting the other of said members to said equipment portion,
 (VI) a source of hydraulic fluid having:
  (A) means for pressurizing said fluid,
  (B) a pair of discharge openings,
  (C) an intake,
 (VII) a first conduit connecting one of said source discharge openings to one of said chamber portions,
 (VIII) a second conduit connecting the other of said source discharge openings to the other of said chamber portions,
 (IX) a valve which:
  (A) is located in said first and second conduits,
  (B) has an armature which:
   (1) has passages therein, (2) is movable between
  (a) a first position in which communication between said discharge openings and said chamber portion along said first and second conduits is closed by said armature,
  (b) has a second position in which:
    (i) communication between said one discharge opening and said one chamber portion along said first conduit is open through an armature passage,
    (ii) communication between said other discharge opening and said other chamber portion along said second conduit is closed by said armature,
    (iii) communication between said other chamber portion and said source intake is open through an armature passage,
  (c) has a third position in which:
    (i) communication between said one discharge opening and said one chamber portion along said first conduit is closed by said armature,
    (ii) communication between said other discharge opening and said other chamber portion along said second conduit is open through an armature passage,
    (iii) communication between said one chamber portion and said source intake is open through an armature passage,
(X) means for normally holding said valve armature in said first position,
(XI) means responsive to a said change in a thermal condition of said equipment for moving said valve armature to its second position and responsive to an opposite change in a thermal condition of said equipment for moving said valve armature to its third position,
(XII) a third conduits which:
  (A) is connected between said chamber portions,
  (B) by-passes said valve,
  (C) has at least one portion which is more restricted than any part of the first and second conduits or said armature passages,
whereby fluid under pressure from said source passes relatively unrestricted to one of said cylinder member chamber portions when said valve armature is in its second or third positions to thereby move the equipment portion upon a said change in a thermal condition of said equipment or an opposite thermal condition change whereby rapid movements of said piston with respect to said cylinder member caused by shock movements of said equipment portion are suppressed when said valve armature is in its first position, and whereby slow movements of said piston with respect to said cylinder member caused by temperature expansion or contraction movements of said equipment portion are substantially unhindered when said valve armature is in its first position.

11. Apparatus for controlling, with respect to fixed structure, the position of at least a portion of fluid handling equipment subject to a change in position due to a change in temperature of said equipment, said apparatus comprising:
(I) a hydraulic cylinder member which has:
  (A) end walls,
  (B) a chamber defined in part by said end walls,
(II) a piston which:
  (A) is located in said cylinder member chamber,
  (B) separates said chamber into two portions,
  (C) is movable with respect to said cylinder member to and from the end walls thereof,
(III) a piston rod member which:
  (A) is connected to said piston,
  (B) extends through:
    (1) at least one of said cylinder member chamber portions,
    (2) at least one of said cylinder member end walls,
(IV) means for connecting one of said members to said fixed structure,
(V) means for connecting the other of said members to said equipment portion,
(VI) a source of hydraulic fluid having:
  (A) a reservoir,
  (B) a rotary pump which:
    (1) is connected to said reservoir,
    (2) is reversible,
    (3) has two openings:
      (a) one of which acts as a discharge opening when the pump rotates in one direction,
      (b) the other of which acts as a discharge opening when the pump rotates in the opposite direction,
(VII) a valve having:
  (A) a casing which:
    (1) has a passage therein,
    (2) has a first port connected to one of said chamber portions,
    (3) has a second port connected to one of said pump openings,
    (4) has a third port connected to the other of said chamber portions,
    (5) has a fourth port connected to the other of said pump openings,
    (6) has a fifth port connected to said reservoir,
  (B) has an armature which:
    (1) lies in said passage,
    (2) is movable in said passage,
    (3) has ports therethrough,
    (4) has a first position in which said first and third casing ports are blocked,
    (5) has a second position in which:
      (a) said first and second casing ports are connected by an armature port,
      (b) said third and fifth casing ports are connected by an armature port,
    (6) has a third position in which:
      (a) said third and fourth casing ports are connected by an armature port,
      (b) said first and fifth casing ports are connected by an armature port,
  (C) an actuator chamber which:
    (1) is located at each end of the casing passage,
    (2) is connected to a pump opening,
  (D) a spring which:
    (1) is located in each chamber,
    (2) is connected to said armature,
    (3) urges said armature into its first position,
(VIII) means responsive to a said change in the said equipment temperature for rotating said pump in one direction and responsive to an opposite change in the said equipment temperature for rotating said pump in the opposite direction,
(IX) a conduit which:
  (A) is connected between said chamber portions,
  (B) by-passes said valve,
  (C) has at least one portion which is more restricted than any of said openings and ports and any of the said connections thereof,
whereby fluid under pressure from said pump passes substantially unrestricted to a cylinder member chamber portion when said valve armature is in its second or third positions to thereby move the equipment portion upon a said change in the temperature of said equipment and an opposite change, whereby rapid movements of said piston with respect to said cylinder member caused by shock movements of said equipment portion are suppressed when said valve armature is in its first position, and whereby slow movements of said piston with respect to said cylinder member caused by temperature expansion and contraction movements of said equipment portion are substantially unhindered when said valve armature is in its first position.

12. Apparatus according to claim 11 wherein said cylinder member chamber portions are connected to said reservoir through second and third conduits independent of said valve and independent of said restricted first conduit portion and wherein pressure relief valves are located in each of said second and third conduits.

13. Apparatus according to claim 11 wherein said reversible pump is driven by a reversible electric motor and wherein said means responsive to a said change in temperature is an electric temperature-sensitive switch.

14. Apparatus according to claim 11 wherein a check valve is located between each of said pump discharge openings and the connection thereof to a valve casing port and wherein said check valve permits flow only away from said pump.

15. Apparatus according to claim 11 wherein each of the pump openings acts as a pump intake when the other is acting as a discharge opening, wherein the said connection of the pump to the reservoir is through these pump intakes, wherein check valves are located between said reservoir and pump intakes and wherein said check valves permit flow only in the direction from said reservoir.

16. Apparatus according to claim 11 wherein said piston rod member extends through both said cylinder member chamber portions and through both of said cylinder member end walls.

17. The method of controlling the flow of hydraulic fluid to and from a piston-cylinder unit which controls, with respect to fixed structure, the positions of at least a portion of equipment which is subject to a change in its position due to a change in its thermal condition, said method comprising the steps of:
(I) generating hydraulic fluid pressure at a source,
(II) flowing pressurized hydraulic fluid from said source to said piston-cylinder unit:
  (A) in response to a said change in a thermal condition of said equipment,
  (B) along a path having a predetermined flow resistance,
  (C) to actuate said piston-cylinder unit,
(III) arresting the flow of pressurized hydraulic fluid from said source to said piston-cylinder unit after a predetermined amount of piston-cylinder unit actuation and simultaneously blocking any flow of hydraulic fluid from said piston-cylinder unit to said source,
(IV) by-passing hydraulic fluid:
  (A) around the piston of said piston-cylinder unit from one side of the cylinder to the other,
  (B) through a path which:
    (1) is open when said flow is arrested and blocked,
    (2) has a flow resistance substantially greater than said predetermined flow resistance.

References Cited
UNITED STATES PATENTS

| | | | |
|---|---|---|---|
| 2,432,502 | 12/1947 | Bentley et al. | 137—38 XR |
| 2,955,850 | 10/1960 | Bellinger | 285—302 XR |
| 3,175,961 | 3/1965 | Olsen | 202—268 XR |
| 3,258,022 | 6/1966 | Thompson | 137—37 XR |
| 3,279,484 | 10/1966 | Brinkel | 137—37 |
| 3,298,680 | 1/1967 | Jablin | 285—9 XR |
| 3,330,289 | 7/1967 | Grace | 137—37 |

SAMUEL SCOTT, *Primary Examiner.*